United States Patent [19]
Pohl

[11] Patent Number: 4,809,072
[45] Date of Patent: Feb. 28, 1989

[54] METHOD AND APPARATUS FOR GENERATING A VIDEO WIPE BORDER SIGNAL

[75] Inventor: Winfried Pohl, Büttelborn, Fed. Rep. of Germany

[73] Assignee: Robert Bosch GmbH, Stuttgart, Fed. Rep. of Germany

[21] Appl. No.: 117,012

[22] Filed: Nov. 3, 1987

[30] Foreign Application Priority Data

Nov. 7, 1986 [DE] Fed. Rep. of Germany ....... 3637936

[51] Int. Cl.$^4$ .......................................... H04N 5/272
[52] U.S. Cl. ..................................... 358/183; 358/182
[58] Field of Search .......................... 358/22, 182, 183

[56] References Cited

U.S. PATENT DOCUMENTS 4,121,253 10/1978 McCoy ................................. 358/182
4,646,154 2/1987 Shinohara ............................. 358/183

OTHER PUBLICATIONS

Kompakter Produktions-Mischer R . . . ME, Service Manual 4-20759-01-SD, Bosch, pp. 3/1, 3/55-3/66, Jul. 1983.
"Compact Production Switcher with Control Function Memory" Brochure Published by BTS, May 1987.
"RME Compact Production-Switcher PAL NTSC PAL-M" Brochure Published by Bosch, Apr. 1984.

Primary Examiner—Tommy P. Chin
Attorney, Agent, or Firm—Frishauf, Holtz, Goodman & Woodward

[57] ABSTRACT

Horizontal and vertical wipe signals are additively modified to vary the boundary between an inserted picture to be faded in and the previously displayed picture to be faded out as part of the fading transition. The resulting modified wipe signals are compared with a zero voltage reference signal to determine intervals, respectively in horizontal and vertical scan, during which the substituted picture is to be switched in. The picture switching signal is also used to substitute, during that same interval, an inverted wipe signal instead of the non-inverted wipe signal. The composite wipe signal thus produced is then compared with a border width control voltage to produce horizontal and vertical border-defining pulses respectively centered on the flanks of the picture switching pulse. The horizontal and vertical border defining pulses are multiplicatively combined to produce the ultimate border defining pulse for inserting the border between the two picture contents. Centering of the border on the boundary between the picture contents is assured even when the border width is narrowed down to bare visibility.

4 Claims, 4 Drawing Sheets

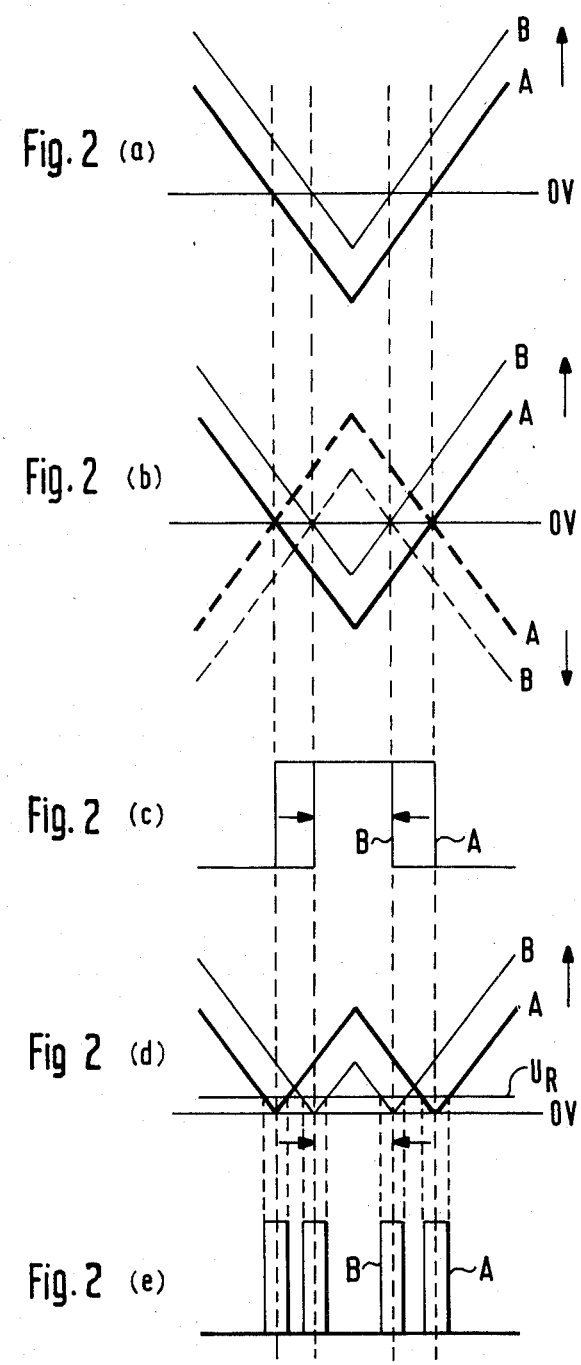

METHOD AND APPARATUS FOR GENERATING A VIDEO WIPE BORDER SIGNAL

This invention concerns the generation of a video border signal in a manner dependent upon horizontal and vertical frequency wipe configuration signals which are variable by means of fading control signals.

In producing a video program in a television studio a "wipe" procedure is often utilized in which a first television picture is inserted, within an expanding or shifting geometrical outline, into a second television picture. For emphasizing this transition it is known to provide a border for the geometrical figure in the form of a stripe which is adjustable in width, color and transition duration.

Means for accomplishing such bordering with geometric figures used transitionally for inserting one television within another are included, for example, in equipment known as "Compact Production Switcher with Control Function Memory" having model designations R . . . ME, distributed by Broadcast Television Systems GmbH. Those means appear in the so-called "Pattern Processor" RC 722 and its associate "Wipe Control" RC 721, originally described in connection with a two level compact switcher R 102 ME 9627A made available in models for PAL, NTSC, PAL-M television standards, and shown in pages 3155 to 3165 and FIGS. 10–16 of a publication made available to users of "RME" equipment, the contents of which are hereby incorporated by reference. In that equipment there are compared, on the one hand, a constant signal determined by a DC voltage, used as a reference, and a fading control signal for generating a steep sided switching signal for switching between the first and the second television picture and on the other hand, the same fading control signal and DC voltages that are presented during intervals intended to correspond to a symmetrical offset on each side of the boundary between the two television pictures.

Since the latter DC voltages must be symmetrically variable and simultaneously shiftable by means of the fading control voltage, the electronic complication and expense is rather high. From the two signals respectively corresponding to the inner and outer border edges the desired video bordering signal is obtained by a kind of subtraction or difference formation in the video portion of the mixer.

This method and system used in the above-discussed compact switcher for television studios has the disadvantage that for narrow borders there is only a slight width stability of the border that is produced. In the case of a shift of figure edge and border it is possible that the color stripe of a narrow border no longer covers the "cut" edge between the two pictures but rather lies to one side thereof. Since the signal preparation operations respectively for horizontal and vertical frequency signals are carried out separately, it can happen that when the border width is narrowed, the horizontal bordering disappears before the vertical bordering, or vice versa.

SUMMARY OF THE INVENTION

It is an object of the present invention to provide a method and circuit by which a video bordering signal can be generated in a substantially simpler manner, which is stable with respect to width, position, symmetry and reproducibility.

The signals which generate the geometric boundary between new and old picture signals are known in the art as "wipe" signals or "wipe control signals". Horizontal and vertical wipe function signals are, as usual, separately generated and separately controlled by horizontal and vertical fading control voltages. In the time course of both of these kinds of wipe signals (as controlled by the respective fading control voltages, there can be defined an interval between successive and oppositely directed transitions of wipe signals through a fixed reference potential level, during which interval the direction of potential change of the controlled wipe signal reverses. From each such interval there is derived a pulse shaped picture switching signal. An inverted wipe signal is also generated. In a manner dependent upon the picture switching signal, either the wipe signal or the inverted wipe signal is transmitted for deriving from a combined or composite wipe signal with inverting transitions taking place at the beginning and end of the aforesaid interval. Then pulse-shaped horizontal and vertical bordering signals of adjustable width are produced by comparison with a variable DC voltage. Finally the horizontal and vertical bordering signals are multiplied by each other for generating the video bordering signal.

The invention has the advantage that the video bordering signal is always in a covering position with respect to the switch over boundary between the two television pictures, since the middle of the bordering signal is now necessarily controlled defined by the picture switching over signal. There is the further advantage that when the border width is narrowed the horizontal and vertical borders always vanish simultaneously, since the points of inflection for the horizontal and vertical composite wipe signals lie exactly at the fixed reference potential. Furthermore unsymmetrical border edges resulting from unbalance or amplifier tolerances of the participating multipliers is no longer possible, since only a single multiplier generates both edges. The stability of the border width is thereby increased.

Preferably the generation of the pulsiform horizontal and vertical bordering signals is made variable as to "softness" of border edges by means of voltages respectively controlling the pulse-flank steepness of the horizontal and vertical bordering pulses.

The invention provides electrical circuit apparatus for carrying out the method of invention, but that apparatus is not summarized here because it will be better understood after the illustrated description which follows.

BRIEF DESCRIPTION OF THE DRAWINGS

The invention is further described by way of illustrative example, with reference to the annexed drawings, in which:

FIGS. 2(a), 2(b), 2(c), 2(d) and 2(e) respectively show, on a common time scale, the course of signals occurring at locations designated in FIG. 1 by corresponding parenthetical lower case letters.

DESCRIPTION OF THE ILLUSTRATED EMBODIMENT

Figure 1:
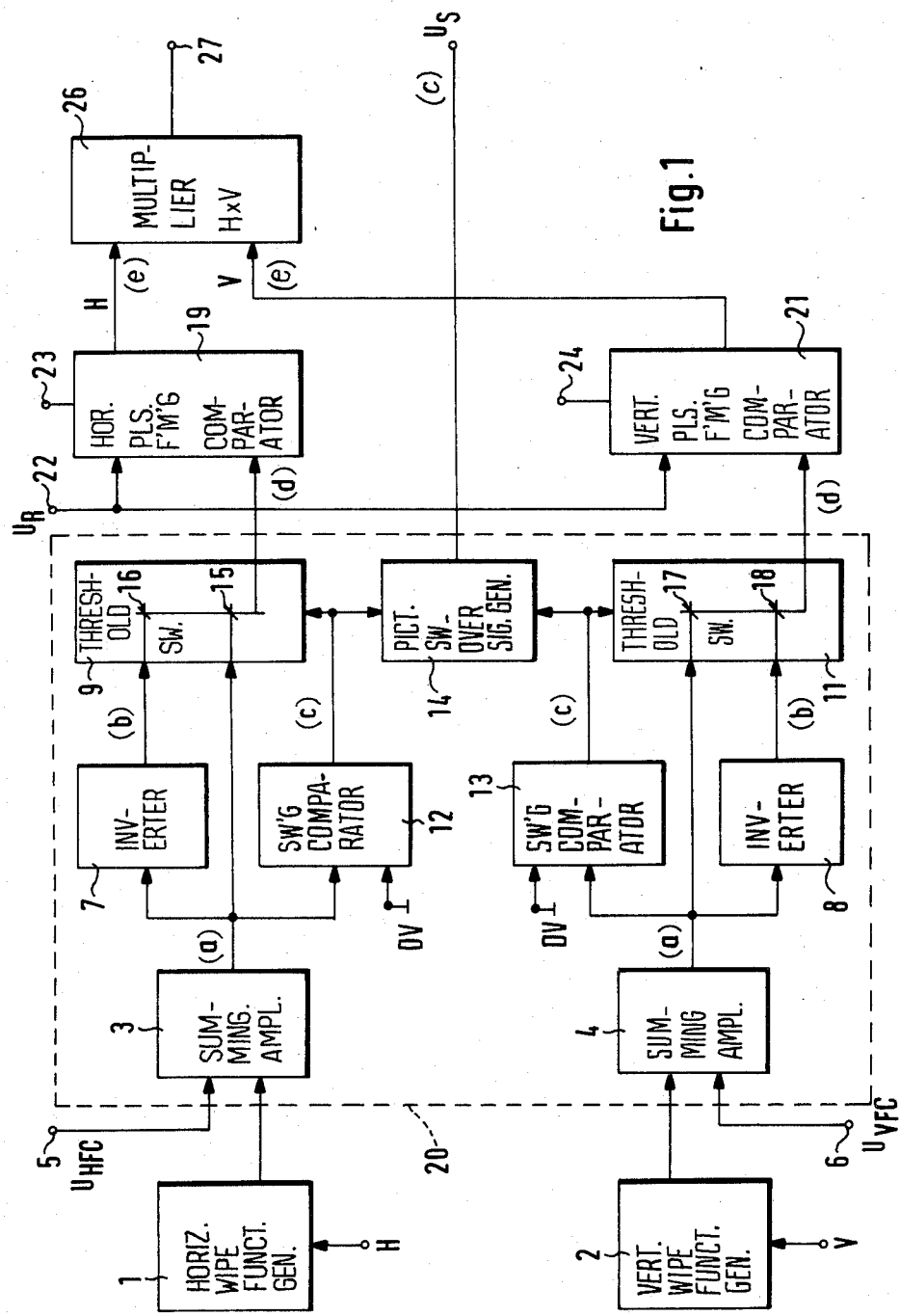
FIG. 1 is a circuit block diagram of apparatus for carrying out the method of the invention.

In the circuit block diagram of FIG. 1 there are generated by the function generators 1 and 2, respectively, horizontal and vertical frequency function signals, known as wipe signals, such as for example sawtooth, triangular or parabolic function signals, which are respectively synchronized by horizontal and vertical synchronizing pulse signals. The generation of such wipe signals is known and does not need to be further described here. These wipe signals are respectively supplied to a first input of a summing amplifier 3 and a first input of a summing amplifier 4. Second inputs 5 and 6 of the summing amplifiers are respectively provided with a horizontal fading control voltage $U_{HFC}$ and a vertical fading control voltage $U_{VFC}$ which are, essentially, relatively slowly varying DC voltages.

The signals at the outputs of the summing amplifiers 3 and 4 are illustrated for the case of a triangular function signal, in FIG. 2(a). The diagrams of FIGS. 2(a) to 2(e) are all drawn to the same time scale. The effects of two different wipe signals A and B, the former shown in a heavy line and the second in a light line, are illustrated. Both of these wipe signals have been additively combined with a fading control signal which varies during fading. The wipe signal B may, for example, be a wipe signal occurring at a later stage of fading than the wipe signal A, as indicated by the vertical arrows at the right of certain of these figures.

This series of 5 diagrams applies both to the horizontal scan frequency wipe signals and to the vertical scan frequency wipe signals, but it must be understood that in the case of the horizontal frequency wipe signals the fading control signal that shifts the wipe signal from A to B is the horizontal fading control voltage $U_{HFC}$ and in the case of the vertical frequency wipe signal, the fading control signal of which produces the shift from A to B is the vertical fading control voltage $U_{VFC}$.

FIGS. 2(a), 2(b) and 2(d) show the reference voltage line (0V) which is typically 0 volts, which may be taken as ground potential, and with reference to which the fading control voltages vary.

The output signals (a) of the summing amplifiers 3 and 4, are now supplied, in each case, to two different circuits, one of which is an inverter 7 or 8 and the other a threshold switch 9 or 11 using the reference voltage 0V as the switching threshold. These are analog circuit switches. At the output of the inverters 7 and 8 there are accordingly available signals illustrated in broken lines in FIG. 2(b) which exhibit a positive apex above the negative apex of the corresponding signal already shown in FIG. 2(a).

The output signals illustrated in FIG. 2(a) coming from the summing amplifiers 3 and 4 are also respectively supplied to comparator switches 12 and 13 each of which have a second input connected to the above-mentioned reference potential 0V. Both pulse signals A and B, illustrated together in FIG. 2(c), are respectively derived (from the signals illustrated in FIG. 2(a)) in both the comparators 12 and 13, respectively for horizontal and vertical picture switching control. These pulse signals serve on the one hand for switch-over control of the analog switches 9 and 11 and on the other hand are supplied to a switch-over signal generator 14, in which the horizontal and vertical picture switching pulse signals are combined into a single video switch-over signal $U_S$. The latter serves for switching over from one to the other of two video signals having different picture contents.

The analog switches 9 and 11 are respectively controlled by the H and V pulse signals of the form (c) in such a way that the switching paths 15 and 17, are conducting so long as the signals (a) lie above reference potential and the alternate switching paths 16 and 18, are conducting when the signals (a) lie below reference potential. As a result there appear at the output of the respective switches 9 and 11 the two signals A and B illustrated in FIG. 2(d) which both have components that are all above reference potential. The circuit components 3 to 14 are enclosed in the broken line rectangle 20 in FIG. 1 to show that they conveniently form an electronic equipment unit.

The signals illustrated in FIG. 2(d) are then supplied to respective first inputs of pulse forming comparators 19 and 21, as illustrated in FIG. 1 which, at their respective second inputs, are provided with a common variable DC voltage $U_R$ provided to the circuit through the terminal 22. The width of the video bordering is adjustable by means of this DC voltage $U_R$. The comparators 19 and 21 preferably consist of multipliers and have variable amplification. By means of adjustable DC voltages respectively provided at the terminals 23 and 24 the respective amplifications of the multipliers 19 and 21, and therefore the steepness of the pulse flanks of the bordering signal illustrated in FIG. 2(e), can be altered. These DC voltages can be adjusted for more or less soft transition between picture signal and bordering signal.

The signals (e) produced by the horizontal and vertical pulse producing comparators 19 and 21 are finally combined with each other in a multiplier 26, so that at the output 27 thereof a complete video bordering signal, likewise illustrated in FIG. 2(e), is available which is effective in both the horizontal and vertical directions.

As above mentioned, FIGS. 2(a) to 2(e) show the generation of bordering signals switched in and out respectively before and after each of the flanks of the picture switch-over signal $U_S$ which has the time aspect shown in FIG. 2(c). Both for the border corresponding to the fading-controlled wipe signal A shown in heavy lines in FIGS. 2(a) and for the border corresponding to the later fading-controlled wipe signal B shown in light lines in FIG. 2(a), the border is always centered on a flank of the picture-switching signal. The separate fading control voltages $U_{HFC}$ and $U_{VFC}$ permit expanding, contracting or shifting the inter-picture boundaries horizontally and vertically at different rates or only horizontally or only vertically.

Figure 3A:
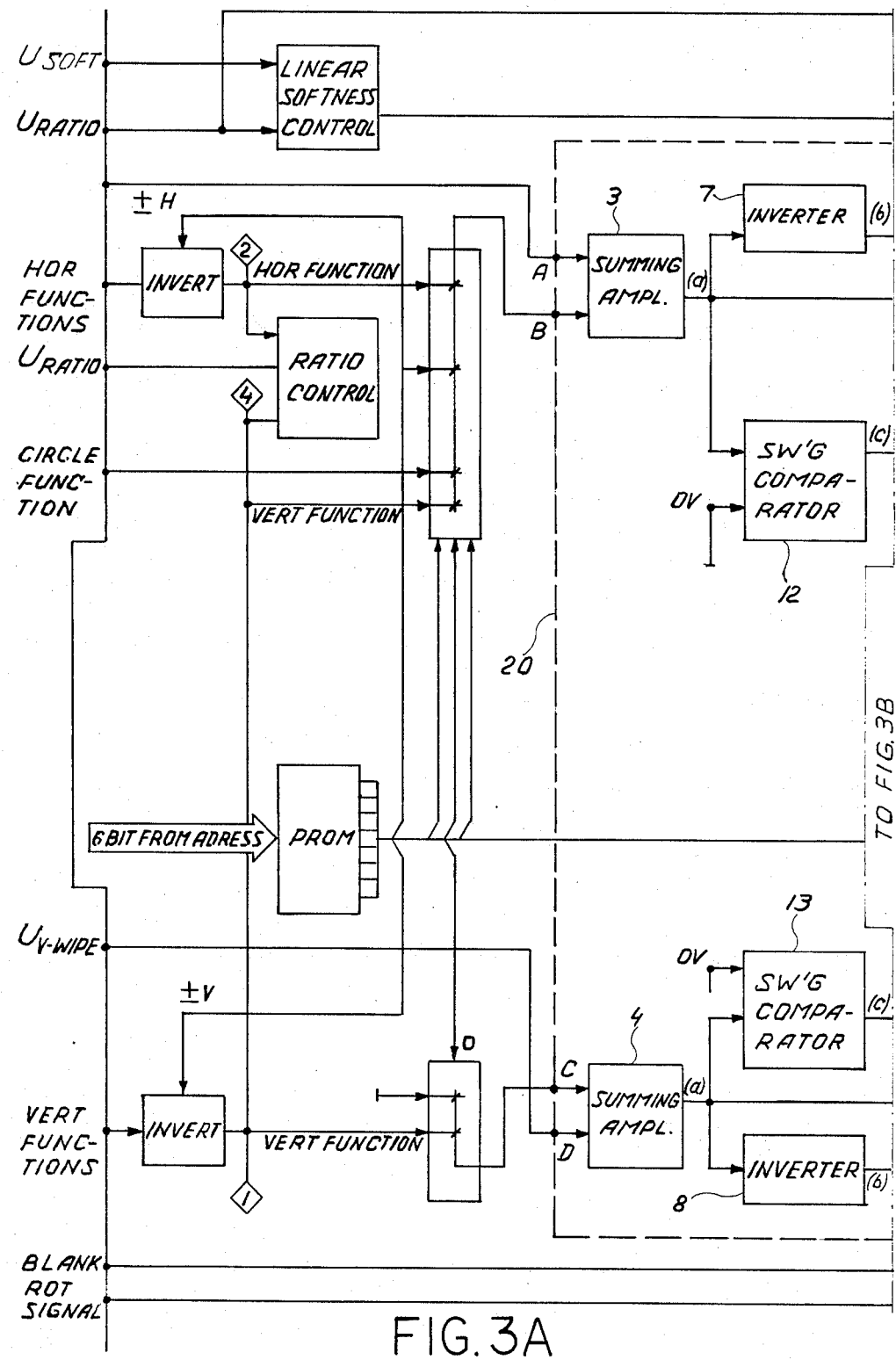
FIG. 3 is a block circuit diagram showing a modification of a commercially available pattern processor unit for incorporation of the apparatus of FIG. 1 for practice of the present invention.
Figure 3B:
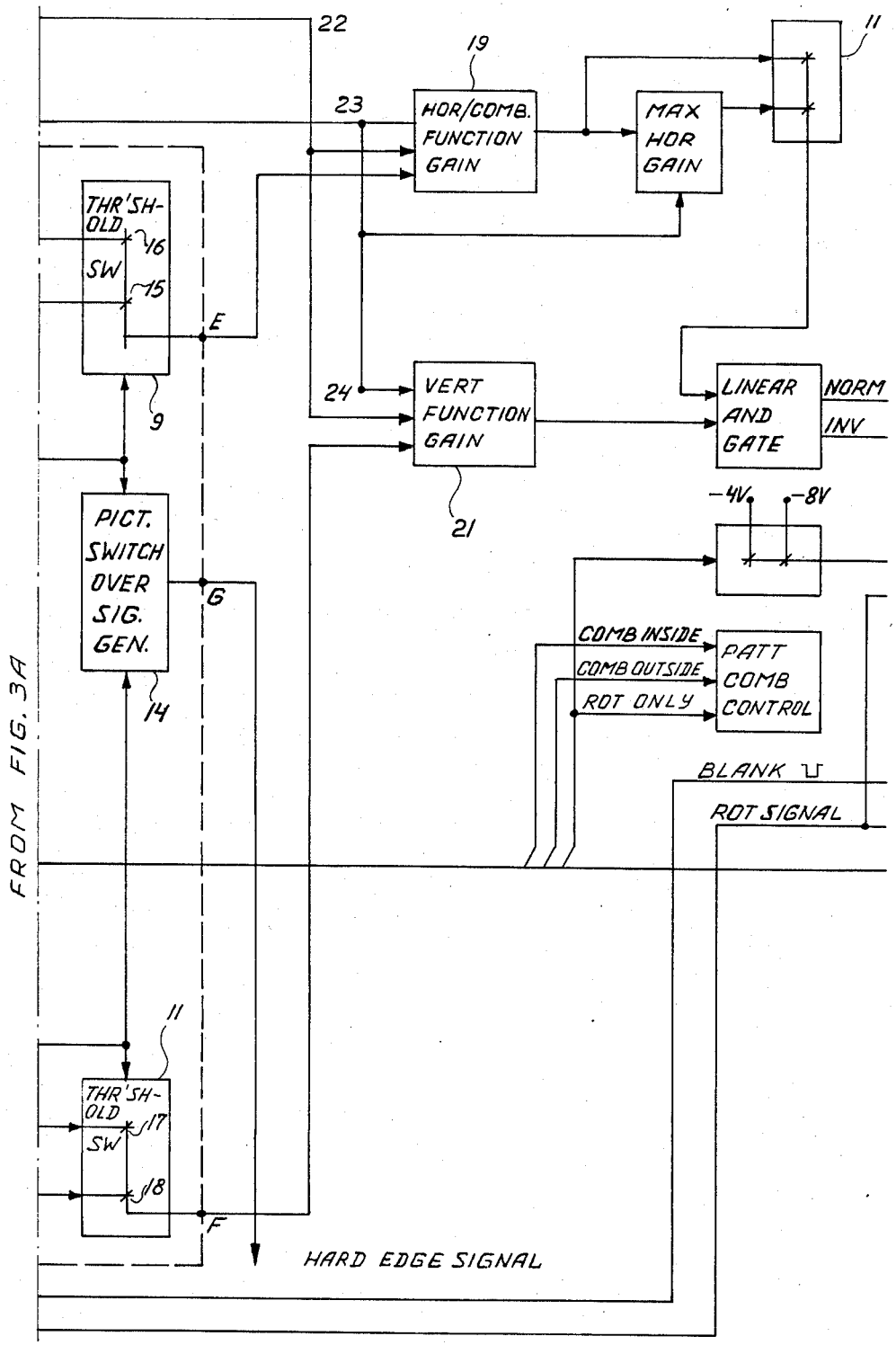

FIG. 3 shows the incorporation of the combination of circuits enclosed in the rectangle 20 of FIG. 1 and certain other circuits of FIG. 1 in the "pattern processor" RC722 mentioned above, in which the circuit blocks other than those shown in FIG. 1 are shown in FIG. 16 of the publication above-mentioned. FIG. 3 contains only those circuit components from FIG. 16 of that publication which are necessary for the understanding of how the circuits of the present invention may be incorporated in a production model of a "pattern processor".

At circuit point A designated in FIG. 3 the variable DC voltage $V_{HFC}$ is supplied. Circuit point B is connected to a cross bar switch or its electronic equivalent which makes a selection between the various available function generator outputs. The circuit point C is supplied with the vertical frequency function generator output and the circuit point D is supplied with the DC voltage $U_{VFC}$.

The circuit component 19 of FIG. 1 corresponds to the circuit block "HOR./COMB. function gain" of FIG. 3, while the circuit block 21 of FIG. 1 corresponds to the circuit block "VERT. function gain" of FIG. 3.

The horizontal frequency border signal is supplied from circuit point E to the circuit components just mentioned. The vertical frequency border signal is, likewise, supplied to them from the circuit point F.

The components above-mentioned also receive, respectively at 23 and 24 (designations which correspond to the terminals 23 and 24 in FIG. 1), the soft edge control voltage. They also receive the border setting voltage $U_R$ over the line 22. A "hard edge" switchover signal is obtained from circuit point G.

Although the invention has been described with reference to a particular illustrative embodiment, it will be understood that variations and modifications are possible within the inventive concept.

I claim:

1. Method of generating a video bordering signal in a manner dependent upon horizontal and vertical scan frequency wipe signals that generate a wipe boundary geometrical figure between display of two different picture contents and are subject to variation by fading control voltages for fading from one to another of said picture contents, comprising the steps of:

comparing said horizontal and vertical wipe signals as respectively modified by horizontal and vertical fading control signals, with a reference potential to produce inverted horizontal and vertical wipe signals during an interval between successive passages of the time course of potential of each of said wipe signals through the value of said reference potential and at the same time producing both a horizontal and a vertical switching pulse signal during each said interval;

deriving picture switchover pulse signals from said horizontal and vertical switching pulse signals and utilizing the flanks of each said picture switchover pulse signal to switch in respectively opposite directions, between video signals respectively of said two different picture contents;

combining said wipe signals outside of said interval with said inverted wipe signals within said interval and comparing the resulting combined signal to a border-width determining adjustable potential ($U_R$) to produce pulse-shaped horizontal and vertical bordering signals, and multiplying together said horizontal and vertical bordering signals to produce a bordering signal suitable for keying a selected bordering color tone to insert it as a border between two picture contents switched by the flanks of said picture switchover pulse signal.

2. Apparatus for generating a video bordering signal for displaying a border centered on the boundary between displays of two different picture contents on the same television screen defined by wipe signals which are variable by a fading control signal for fading from one of said picture contents to the other, comprising, in addition to sources of horizontal and vertical scan frequency wipe signals, horizontal scan frequency video bordering signal generating means comprising:

first signal combining means (3) for combining said horizontal scan frequency wipe signals with horizontal fading control signals ($U_{HFC}$) to produce at an output modified horizontal wipe signals (a);

first signal inversion means (7) connected to the output of said first signal combining means (3) for producing inverted modified horizontal wipe signals;

first comparator switching means (12) having a connection to a reference voltage source (OV) and an input connected to the output of said first signal combining means for producing a horizontal picture substitution switching signal (c) in intervals between successive and oppositely directed transitions of said modified horizontal wipe signals through the level of the voltage of said reference voltage source;

first wipe signal switching means (9) connected to the respective outputs of said first signal combining means (3), first signal inversion means (7) and first comparator switching means (12) for substitution of said inverted modified horizontal wipe signals in place of the output of said first signal combining means (3) during intervals in which said picture substitution switching signal is present in the output of said first comparator switching means (12) to produce horizontal composite wipe transition signals (d);

first border width control means connected to a source of variable border width control voltage ($U_R$) and to said first wipe signal switching means for producing horizontal video bordering pulse signals during respective intervals each of which is between successive oppositely directed transitions of said horizontal wipe transition signals through the level of voltage of said border width control voltage;

vertical scan frequency video bordering signal generating means comprising;

second signal combining means (4) for combining said vertical scan frequency wipe signals with horizontal fading control signals ($U_{VFC}$) to produce, at an output, modified vertical wipe signals (a);

second signal inversion means (8) connected to the output of said second signal combining means (4) for producing inverted modified vertical wipe signals;

second comparator switching means (13) having a connection to said reference voltage source (OV) and an input connected to the output of said second signal combining means for producing a vertical picture substitution switching signal (c) in intervals between successive and oppositely directed transitions of said modified vertical wipe signals through the level of voltage of said reference voltage source;

second wipe signal switching means (11) connected to the respective outputs of said second signal combining means (4), second signal inversion means (8) and second comparator switching means (13) for substitution of said inverted modified vertical wipe signals in place of the output of said second signal combining means (4) during intervals in which said picture substitution switching signal is present at the output of said second comparator switching means (13) to produce vertical composite wipe transition signals (d);

second border width control means connected to said source of variable border width control voltage ($U_R$) and to said second wipe signal switching means for producing vertical video bordering pulse signals during respective intervals each of which is between successive oppositely directed transitions of said vertical wipe transition signals through the level of the voltage of said border width control voltage;

first vertical and horizontal control signal combining means (14) having inputs connected to said first (12) and second (13) comparator switching means for combining said horizontal and vertical picture substitution switching signals into a combined picture substitution switching signal ($U_S$), and second vertical and horizontal signal combining means (26) having inputs connected to said first (19) and second (21) border width control means to produce, at an output (27), combined video bordering signals of controllable width.

3. Apparatus as defined in claim 2, wherein said first (3) and second (4) signal combining means are algebraically additive signal combining means.

4. Apparatus as defined in claim 2, wherein said second vertical and horizontal signal combining means (26) is a multiplicative signal combining means and wherein said first (19) and second (21) border width control means include means for varying the slope of the flanks of pulses appearing at their respective outputs for varying the sharpness of definition of a displayed border.

* * * * *